US010642984B2

(12) United States Patent
Heagney

(10) Patent No.: US 10,642,984 B2
(45) Date of Patent: May 5, 2020

(54) SECURE DRIVE AND METHOD FOR BOOTING TO KNOWN GOOD-STATE

(71) Applicant: United States of America, as represented by the Secretary of the Navy, Patuxent River, MD (US)

(72) Inventor: Christopher Heagney, Jacksonville, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 78 days.

(21) Appl. No.: 16/006,185

(22) Filed: Jun. 12, 2018

(65) Prior Publication Data

US 2019/0377878 A1 Dec. 12, 2019

(51) Int. Cl.
*G06F 21/57* (2013.01)
*G06F 9/44* (2018.01)
*G06F 21/76* (2013.01)
*G06F 21/79* (2013.01)
*H04L 9/30* (2006.01)
*G06F 11/14* (2006.01)
*G06F 12/14* (2006.01)

(52) U.S. Cl.
CPC ........ *G06F 21/575* (2013.01); *G06F 11/1441* (2013.01); *G06F 12/1408* (2013.01); *G06F 21/76* (2013.01); *G06F 21/79* (2013.01); *H04L 9/30* (2013.01); *G06F 2212/1052* (2013.01)

(58) Field of Classification Search
None
See application file for complete search history.

(56) References Cited

U.S. PATENT DOCUMENTS

| | | | |
|---|---|---|---|
| 2009/0222910 A1* | 9/2009 | Le Bihan | G06F 21/445 726/19 |
| 2018/0081828 A1* | 3/2018 | Bell | G06F 12/1408 |
| 2018/0293012 A1* | 10/2018 | Khatri | G06F 13/16 |
| 2019/0004948 A1* | 1/2019 | Prasad | G06F 1/3275 |

* cited by examiner

*Primary Examiner* — Danny Chan
(74) *Attorney, Agent, or Firm* — Olivia Scheuer; NAWCAD

(57) ABSTRACT

An apparatus and method of a secure drive is provided. The system includes a gate array, a non-volatile memory drive, and a power source. The non-volatile memory drive has secure, operational, and persistent memory spaces. The secure memory space is programmed with an encryption key and an encrypted disk image. In response to a power cycle, the gate array reads the encrypted disk image from the secure memory, authenticates the disk image using the encryption key, decrypts the encrypted disk image, and writes the decrypted disk image to the operational memory. The decrypted disk image is used to boot a computer. The computer is booted to a known good state each time the power is cycled.

3 Claims, 1 Drawing Sheet

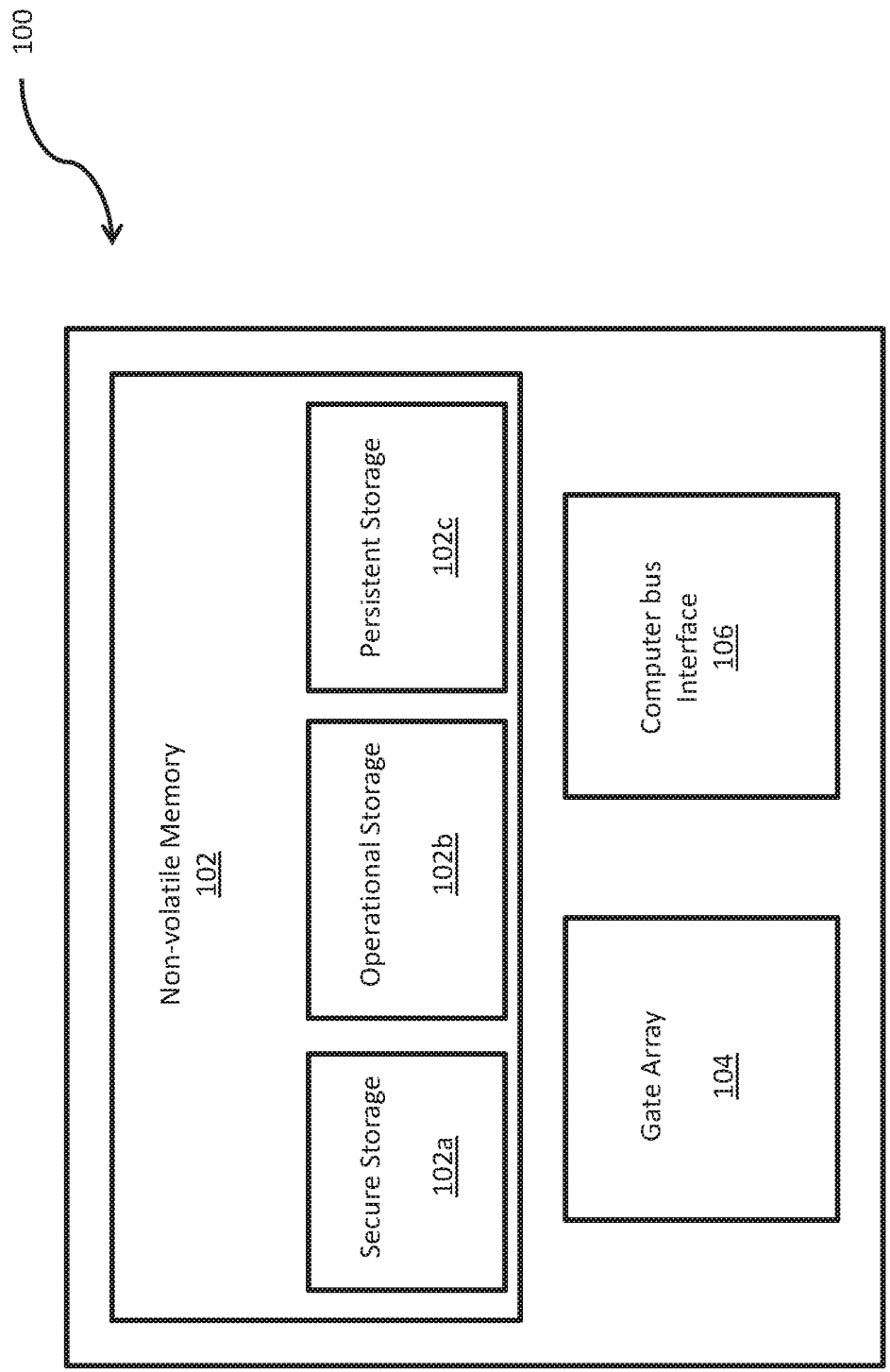

US 10,642,984 B2

SECURE DRIVE AND METHOD FOR BOOTING TO KNOWN GOOD-STATE

STATEMENT OF GOVERNMENT INTEREST

The invention described herein may be manufactured and used by or for the Government of the United States of America for governmental purposes without payment of any royalties thereon or therefor.

BACKGROUND

In computing, booting of the operating system, as well as additional systems, is required to initialize the computer system. Generally, the operating system is loaded into main memory (e.g., RAM) from persistent memory (e.g., a hard drive). Often the booting process can take tens of seconds to minutes, based on the computer anatomy.

As the use of computers, and computing devices, become more and more integrated into daily events and business, the safety associated with computers is of the utmost importance. One potential security threat is a change made to the operating system by an intruder, such as stealing, editing, or deleting. Such security threats can be disastrous as they can lead to computer failures and data leaks.

SUMMARY

In general, in one aspect, a memory drive of a computer comprising: a gate array; a non-volatile memory drive, comprising a secure memory, an operational memory, and a persistent memory, wherein the secure memory is programmed with a public encryption key and an encrypted disk image; a power source; and wherein the gate array reads the encrypted disk image from the secure memory, decrypts the encrypted disk image, creating a decrypted disk image, and writes the decrypted disk image to the operational storage in response to a first power cycle; wherein the decrypted disk image is used to boot a computer; and wherein the computer is booted to a known good state each time the power is cycled.

In general, in another aspect, a method of booting a computer program, the method comprising: providing power to a computer having a secure drive, wherein the secure drive comprises a gate array and a non-volatile memory drive, wherein the non-volatile memory drive comprises a secure memory, an operational memory, and a persistent memory; receiving, by the gate array, an encrypted disk image, wherein the encrypted disk image is stored on the secure memory; authenticating, by the gate array, the encrypted disk image, wherein a public-private key pair exchange is provided to the gate array, and a symmetric encryption key is used to decrypt the encrypted disk image, creating a decrypted disk image; and writing, by the gate array, the decrypted disk image to the operational memory; and booting, by the gate array, the decrypted disk image on the computer, wherein the computer is booted to a known good state when power is cycled.

Unless otherwise defined, all technical and scientific terms used herein have the same meaning as commonly understood by one of ordinary skill in the art to which this invention belongs. Other features and advantages will be apparent from the following detailed description.

DRAWINGS

These and other features, aspects and advantages of the present invention will become better understood with reference to the following description and appended claims, and accompanying drawings wherein:

FIG. 1 is a functional block diagram illustrating the hardware of the secure drive, in accordance with an embodiment of the present invention.

DETAILED DESCRIPTION

Embodiments of the present invention recognize that security of an operating system, among other computer files, is imperative for computer security. In many existing technologies, the operating system is open for attack. Further, once an operating system, or another prominent program, has been attacked, reoccurring use of the damaged operating system can cause ongoing and increased problems. Embodiments of the present invention are a system to protect an operating system, or another program, reducing the risks associated with malware.

Embodiments of the present invention function as a standard mass storage device—including, but not limited to, a SATA. SATA interfaces, memory, and an integrated circuit are used to protect prominent programs from malware attacks. Embodiments of the present invention are an alternative to, or enhance security of, mass storage and SATA devices, found in existing computing devices. Embodiments of the present invention provide a means to provide a clean copy of an operating system or program each time the computer is booted. Embodiments of the present invention may modify existing mass storage devices by operating between the mass storage device interface and the computer interface.

In the following description of the present invention, reference will be made to various embodiments which are not all inclusive. The current invention can be implemented using various forms of software and hardware. However, the preferred embodiments and best mode of the present invention are illustrated by way of example below and in FIG. 1.

Referring to FIG. 1, a functional block diagram illustrating the hardware of the secure drive is shown. Secure drive 100 includes non-volatile-memory 102, gate array 104, computer bus interface 106, and a power input (not shown). In some embodiments, secure drive 100 includes additional components.

Non-volatile memory 102 is a memory component which maintains data stored regardless of power being supplied to the component. Non-volatile memory 102 can include, but is not limited to, hard drives, flash memory, solid state drives, and optical media. In some embodiments, secure drive 100 contains more than one non-volatile memory 102. For example, where secure drive contains three non-volatile memory 102, a first non-volatile memory—secure memory 102a—is loaded with a secure encrypted disk image, a second non-volatile memory—operational memory 102b—is over-written during power-on with the decrypted secure image, and a third non-volatile memory—persistent memory 102c—is available for persistent storage.

Gate array 104 performs authentication using asymmetric encryption keys. This allows for secure creation and use of the data stored in secure memory 102a. Gate array 104 is a prefabricated chip of integrated circuits, capable of being programed for a specific set of applications. In some embodiments, gate array 104 is a field programmable gate array (FPGA) or an application specific integrated circuit (ASIC). Gate array 104 reads and/or writes to each of non-volatile memory 102. For example, gate array 104 loads the encrypted disk image from secure memory 102a, decrypts the disk image, and writes the decrypted disk image to operational memory 102b. Where the disk image is an operating system, a computer can utilize the operating system written to operational memory 102b in the booting process. In response to the decrypted image loading to operational memory 102b, gate array 104 functions as a mass storage device (e.g. SATA) for both operational memory 102b and persistent memory 102c.

Computer bus interface 106 is one or more interfaces for the connection of host bus adapters to mass storage devices, such as non-volatile memory 102.

In some embodiments, an advantage of the secure drive is that decrypted disk images are erased each time power is cycled. Power is cycled by removing power from the system and then restoring power to the system. Therefore, a new, clean, operating system is loaded each time power is provided to the system.

In some embodiments, secure drive 100 can update the secure image stored in secure memory 102a using encryption to authenticate the new image prior to updating. For example, secure drive 100 generates an updated secure image from the operational memory 102b. An encryption key is used to authenticate the updated image and the updated image is copied to the secure memory 102a. FIG. 1 is an example used to demonstrate applications of the present invention; therefore, the examples should not be construed as limiting.

Example 1

The following example describes how the user configures the secure drive on first use out of the box. The secure drive is blank and a secure image must be first loaded. On boot, the user loads and configures software to a known good state (e.g., installs operating system and applications) within operational memory 102b. For first use, the secure drive is loaded at manufacture with an asymmetric encryption key to authenticate the initial user. The asymmetric encryption key is used to authenticate that the update is authorized prior to creating the secure image in the secure memory 102a. Once the user has properly configured the software within operational memory 102b, the user uses the asymmetric encryption key to authenticate that the image is ready to be secured. The user's private key and secure drive's public key are used to generate an authentication key that is copied into secure memory 102a (e.g., Private 2048-bit RSA key, ECC, Diffie-Hellman). The secure drive's private key is burned into gate array 104 and the secure drive's public key is stored as read-only on non-volatile memory 102 at manufacture or initialization. Upon reboot, gate array 104 will authenticate using the user's public key and the secure drive's private key. Gate array 104 then copies and encrypts the contents from operational memory 102b to secure memory 102a. This bulk image encryption uses a new user generated encryption key using symmetric methods (e.g., AES 256-bit, Twofish, Serpent) for high speed encryption and decryption. Prior to reboot, the user will generate a new private-public key pair that will be used to authenticate the next secure image. This allows software on operational memory 102b to become the secure image when the user authenticates. The authentication keys may be stored in a reserved space on the secure drive. This method of authentication provides enhanced security because the user will change the initial manufacturer generated encryption key with a user-defined key known only to the user.

Example 2

The following example describes typical usage after a secure image has been created. Upon power on, gate array 104 reads the image loaded into secure memory 102a. The secure image has been previously loaded with software configured to a known good state and encrypted. Gate array 104 authenticates the secure image using asymmetric encryption keys, and then decrypts the secure image using a symmetric encryption key passed through the asymmetric authentication key exchange. The decrypted secure image is loaded into operational memory 102b for user use. Operational memory 102b is fully accessible for data read/write and will likely contain the operating system and applications. However, during the next power cycle, contents of operational memory 102b will be overwritten with the contents of the secure image from secure memory 102a. Thus, returning the operating system to a known good state. Any malicious software effects are erased. If the user has a need to store data that is not overwritten during a power cycle, the user writes that data to persistent memory 102c.

Example 3

The following example is used to demonstrate proper configuration of the secure drive. A user installs the operating system and application files on operational memory 102b, then authenticates. After authentication, operational memory 102b is used to generate the new secure image. Subsequent boots load the secure image into operational memory 102b and the user uses the operating system and applications. All update/changes to the operating system or applications will remain while the computer is operating, but will be overwritten and returned to a known good state on the next power cycle. If the user saves a file (e.g., picture, music, document, etc.) to persistent memory 102c, the file is available after the power cycle. The user should configure the operating system to not execute any files loaded on persistent memory 102c. This prevents malicious code stored on persistent memory 102c from automatically executing after a power cycle.

The above description is that of current embodiments of the invention. Various alterations and changes can be made without departing from the spirit and broader aspects of the invention as defined in the appended claims.

In many embodiments, the present invention can be used in conjunction with ordinary computing devices. For example, the computing device may include computer processor(s), a communications unit, and communications fabric. In some embodiments, computer components such as memory, cache, persistent storage, and input/output interfaces are encompassed in the present invention.

What is claimed is:

1. A memory drive of a computer comprises of:
   a gate array;
   a non-volatile memory drive, comprising a secure memory, an operational memory, and a persistent memory, wherein the secure memory is programmed with a public encryption key and an encrypted disk image, wherein the operational memory comprises a decrypted disk image, wherein the non-volatile memory drive comprises one or more encryption keys;
   a computer bus interface;
   a power source; and
      wherein the gate array reads the encrypted disk image from the secure memory, decrypts the encrypted disk image, creating a decrypted disk image, and writes the decrypted disk image to the operational storage in response to a first power cycle;
   wherein the decrypted disk image is used to boot a computer;

wherein the decrypted disk image is overwritten in a next power cycle;

wherein the computer is booted to a known good state each time the power is cycled;

wherein the encrypted disk image is an operating system; and wherein the secure memory, operational memory, and persistent memory are non-volatile.

2. The memory drive of claim 1, wherein the encrypted disk image is updated by a user;

wherein the user loads a first secure image to the operational memory space and a new encryption key to the non-volatile memory drive;

wherein the new encryption key comprises a user generated symmetric encryption key encrypted using a user generated private encryption key and the public encryption key; and wherein, in response to a second power cycle, the gate array reads the new encryption key, authenticates using the user generated private encryption key and the public encryption key, retrieves the new user generated symmetric encryption key, and writes the secure image from operational memory over the encrypted disk image on the secure memory.

3. A method of booting a computer program, the method comprises of:

providing power to a computer having a secure drive, wherein the secure drive comprises a gate array and a non-volatile memory drive, wherein the non-volatile memory drive comprises a secure memory, an operational memory, and a persistent memory;

receiving, by the gate array, an encrypted disk image, wherein the encrypted disk image is stored on the secure memory;

authenticating, by the gate array, the encrypted disk image, wherein a public-private key pair exchange is provided to the gate array, and a symmetric encryption key is used to decrypt the encrypted disk image, creating a decrypted disk image;

writing, by the gate array, the decrypted disk image to the operational memory; and booting, by the gate array, the decrypted disk image on the computer, wherein the computer is booted to a known good state each time power is cycled; and overwriting, by the gate array, the decrypted disk image from the operational memory during a next power cycle;

wherein the encrypted disk image is an operating system; and wherein the secure memory, operational memory, and persistent memory are non-volatile.

\* \* \* \* \*